May 15, 1934.  F. G. WALKER  1,959,184
SLICING MACHINE
Filed June 6, 1932  2 Sheets-Sheet 1

Inventor:
Fred G. Walker
By Banning & Banning
Attys.

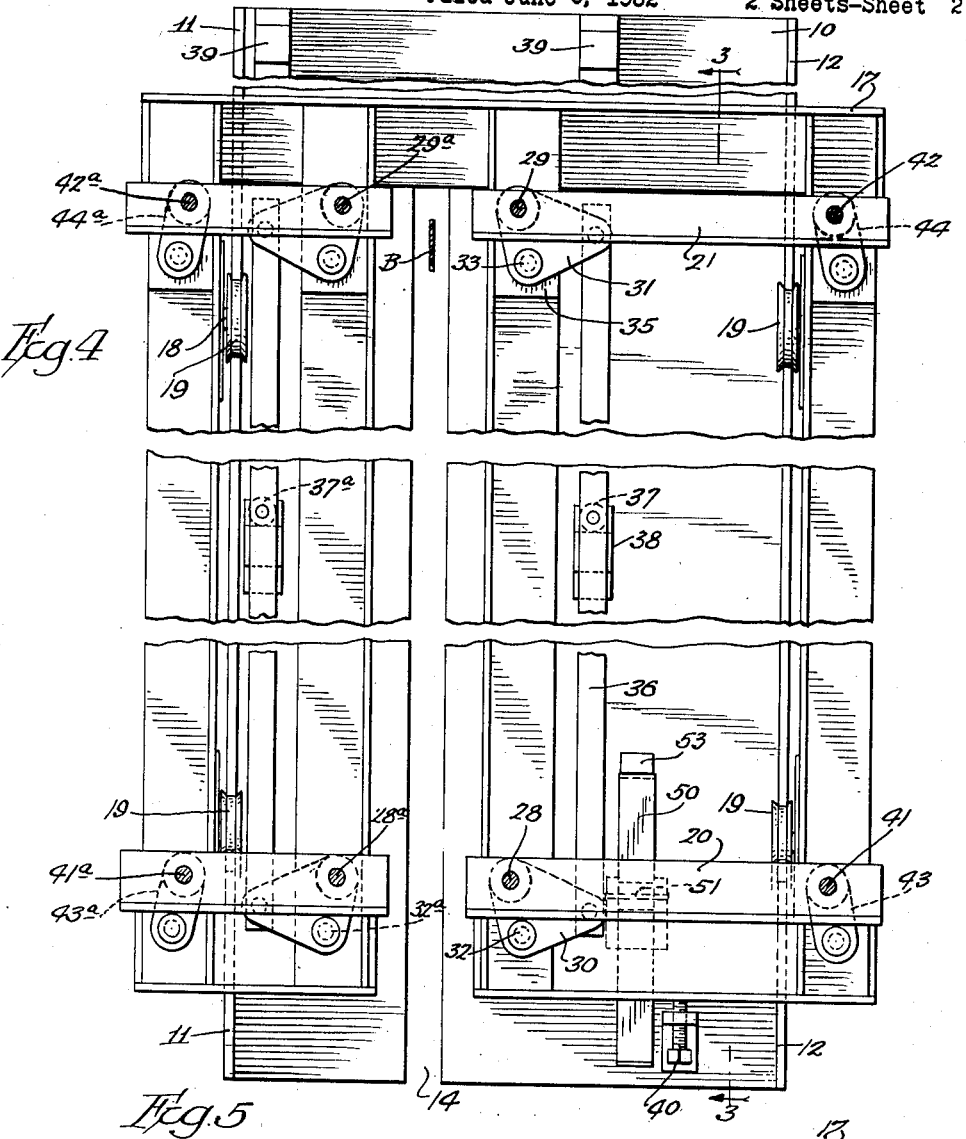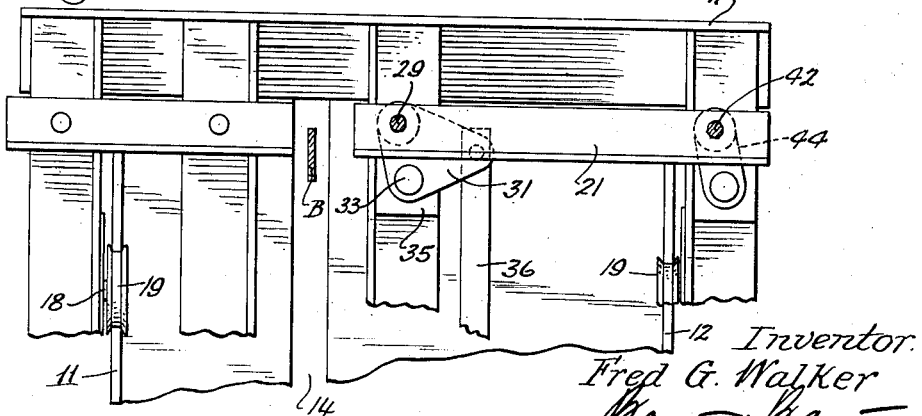

Patented May 15, 1934

1,959,184

UNITED STATES PATENT OFFICE 1,959,184

SLICING MACHINE

Fred G. Walker, Chicago, Ill., assignor to Jones Superior Machine Co., Chicago, Ill., a corporation of Illinois Application June 6, 1932, Serial No. 615,562

4 Claims. (Cl. 143—25)

It is the primary object of this invention to provide an improved machine for slicing or sawing blocks of various kinds of material, particularly solid carbon dioxide.

This and other objects, as will hereinafter appear, are accomplished by this invention, which is fully described in the following specification and shown in the accompanying drawings, in which,—

Fig. 4 is a top plan view of the carriage with the platform removed; and

Fig. 5 is a partial view similar to Fig. 4 showing a modified form of the invention.

Figure 1:
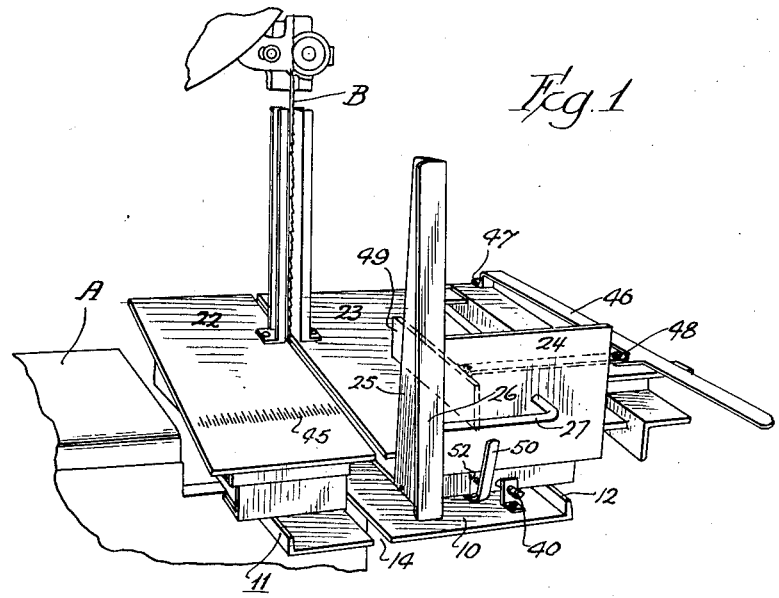
Figure 1 is a partial perspective view of a slicing machine embodying the invention, showing the parts in normally operative position for slicing or sawing.

The embodiment illustrated comprises an attachment for use in connection with a band saw A having a saw blade B or the like driven in any well known manner. To the frame of the band saw A is secured a table 10 having upwardly turned parallel edges 11, 12, which serve as brackets. The saw blade B passes down between suitable guides C which are located in an opening 13 in the table, this opening being provided with a slot 14 which extends to the forward edge so as to permit the saw blades B being readily inserted or withdrawn.

A carriage is made up of side members 15, end members 16, 17 rigidly secured together as by welding. These members carry pins 18, on which run wheels 19 which are preferably flanged to run on the rails or track 11, 12.

Figure 2:
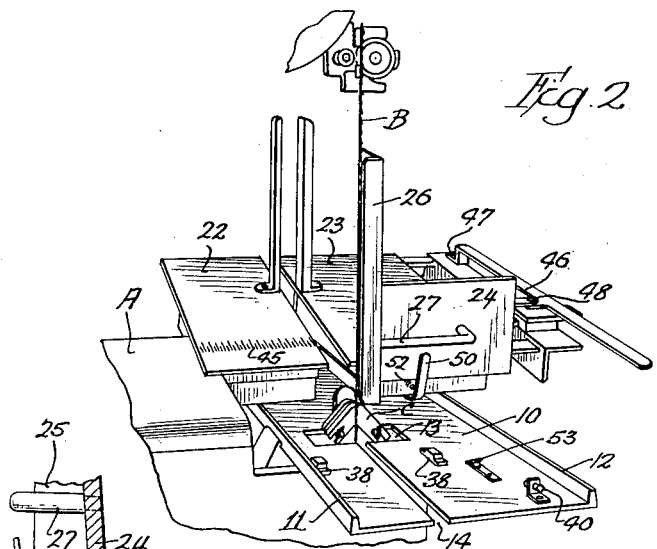
Fig. 2 is a similar view showing the carriage pushed forward into the position which it assumes when a cut is finished.
Figure 3:
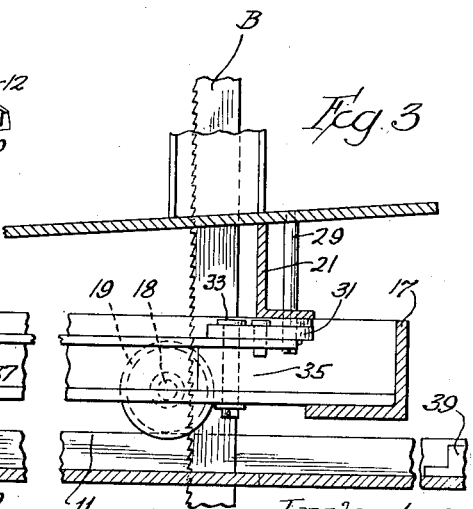
Fig. 3 is a partially enlarged vertical section taken on the line 3—3 of Fig. 4.

Slidable across the top of this carriage are two transverse members 20, 21, the latter being higher than the former so as to cause the platform sections 22, 23 which are secured thereon to be tilted to the left or forward end of the machine, as shown in Fig. 3. The section 23 carries a backboard 24, which is preferably at right angles to the section 23, and to the end of this backboard is secured a shoulder 25 which is flanged at 26 to provide a guard about the band saw blade when the carriage is pushed forward, as shown in Fig. 2, and which will be later explained. A handle 27 is connected to the shield 25 and the back-board 24 by which the carriage may be readily moved.

The two platform sections 22, 23 are caused to separate, as shown in Fig. 2, during movement of the carriage in one direction, and then are brought back to their normal position, as shown in Fig. 1, for movement of the carriage in the other direction. The mechanism for accomplishing this purpose will now be explained.

The section 23 is connected by means of pins 28, 29, as shown in Fig. 3, with levers or bell cranks 30, 31, which are pivotally connected on fulcrum pins 32, 33, which pass through blocks 34, 35 which are rigidly secured in the carriage as by welding. A link 36 is pivotally connected at its two ends to these bell cranks in such a way as to keep them always in parallelism. This link also carries a depending bar 37 which is adapted to engage lugs 38, 39 just before the rearward and forward limits of the movement of the carriage is reached. The rearward motion of the carriage is limited by a stop consisting of an adjusting screw 40 which is so adjusted as to stop the carriage when the levers have moved the platform section 23 to the desired distance from the cutter blade B.

In order to secure parallelism of movement of the section 23, pins 41, 42 are connected to lever arms 43, 44, the position of these parts corresponding to the parts 28, 29 and the levers 32, 33. Similarly, the platform section 22 is operated in the same way and at the same time, but in the opposite direction; similar operating parts being given the same numbers but with the suffix a.

With the parts in the position shown in Fig. 1, a block of material, usually in the form of a cube, is placed on the platform section 23 and forced back against the back-board 24 with its outer edge overhanging the inner edge of the platform section 22, which preferably carries a scale 45 (Fig. 1) graduated to indicate the thickness of the slice which is to be severed.

For moving the block on the platform, a lever 46 is provided which is fulcrumed at 47 and pivotally connected by means of a link 48 with a board 49 which contacts the back of the block.

The parts are normally in the position shown in Figs. 1 and 3, at which time the carriage is locked in its outward position by means of a detent 50 which is fulcrumed at 51, having a spring 52 which holds the detent against a catch 53. Before the carriage can be moved, therefore, forcing the material to be severed against the blade B, the detent 50 must be released. As the carriage again moves back to the outermost position, the detent 50 again snaps over the catch 53. When so released, the carriage can move forward past the moving blade B, thereby severing a slice from the side of the block (not shown), and the slice so severed will fall on the platform section 22.

As the blade passes the end of the carriage, the operator's hands are protected by means of the guard 26. At this point the depending bar 37 engages the lug 39, thereby forcing the platform sections 22, 23 apart. An adjustable stop similar to the stop 40 is provided at this end of the machine, but is not shown. This stop is set to bring the carriage to a standstill as soon as the parts are shifted the desired amount. The carriage is then returned to its normal position, and as it approaches the outer end, the bar 37 engages the lug 38, thereby shifting the parts back to the position shown in Figs. 1, 3 and 4. In Fig. 5 is shown a modified form of the device in which the platform section (not shown) corresponding to 22 is stationary.

Thus it will be seen that I have provided a very simple and yet efficient form of slicing mechanism.

While I have shown and described but a few embodiments of my invention, it is to be understood that it is capable of many modifications. Changes, therefore, in the construction and arrangement may be made without departing from the spirit and scope of the invention as disclosed in the appended claims.

I claim:

1. In a device for sawing blocks, a saw adapted to operate in a vertical plane, a track adjacent thereto lying in a horizontal plane, a carriage adapted to run on said track, a platform mounted on the carriage adapted to hold a block to be sawed, said platform being divided into two sections along a line followed by the saw as the carriage is moved, and means operable by the movement of the carriage to cause the platform sections to separate as the carriage approaches the forward end of its movement and to cause them to approach each other as the carriage approaches the rearward end of its movement.

2. In a device for sawing blocks, a saw adapted to operate in a vertical plane, a track adjacent thereto lying in a horizontal plane, a carriage adapted to run on said track, a platform mounted on the carriage adapted to hold a block to be sawed, said platform being divided into two sections along a line followed by the saw as the carriage is moved, levers fulcrumed on the carriage and pivotally connected to the sections, the other end of the levers being pivotally connected to an operating link, and a lug near each end of movement of the link adapted to stop said link to cause the levers to shift the sections.

3. In a device for sawing blocks, a saw adapted to operate in a vertical plane, a track adjacent thereto lying in a horizontal plane, a carriage adapted to run on said track, a platform mounted on the carriage adapted to hold a block to be sawed, said platform being divided into two sections along a line followed by the saw as the carriage is moved, levers fulcrumed on the carriage and pivotally connected to the sections, the other end of the levers being pivotally connected to an operating link, a lug near each end of movement of the link adapted to stop said link to cause the levers to shift the sections, and means for stopping the carriage at each end of its movement after the shift has been made.

4. In a device for sawing blocks, a saw adapted to operate in a vertical plane, a platform adapted to hold a block to be sawed and to move the same in front of the saw, said platform being divided into two sections along a line followed by the saw as the carriage is moved, and means operable by the movement of the carriage to cause the platform sections to separate as the carriage approaches the forward end of its movement and to cause them to approach each other as the carriage approaches the rearward end of its movement.

FRED G. WALKER.